United States Patent
Tsutsumi et al.

(10) Patent No.: US 9,205,832 B2
(45) Date of Patent: Dec. 8, 2015

(54) CONTROL APPARATUS FOR HYBRID VEHICLE

(71) Applicant: Toyota Jidosha Kabushiki Kaisha, Toyota-shi, Aichi (JP)

(72) Inventors: Takahiko Tsutsumi, Toyota (JP); Toshio Sugimura, Toyota (JP); Seiji Kuwahara, Toyota (JP); Koki Minamikawa, Toyota (JP); Shun Sato, Toyota (JP)

(73) Assignee: TOYOTA JIDOSHA KABUSHIKI KAISHA (JP)

( * ) Notice: Subject to any disclaimer, the term of this patent is extended or adjusted under 35 U.S.C. 154(b) by 0 days.

(21) Appl. No.: 14/172,065

(22) Filed: Feb. 4, 2014

(65) Prior Publication Data

US 2014/0222270 A1 Aug. 7, 2014

Related U.S. Application Data

(60) Provisional application No. 61/761,099, filed on Feb. 5, 2013.

(51) Int. Cl.
*B60W 20/00* (2006.01)
*B60W 10/06* (2006.01)
*B60W 10/08* (2006.01)
*B60W 10/02* (2006.01)

(52) U.S. Cl.
CPC ............... *B60W 20/40* (2013.01); *B60W 10/02* (2013.01); *B60W 10/06* (2013.01); *B60W 10/08* (2013.01); *Y02T 10/52* (2013.01); *Y02T 10/6221* (2013.01); *Y02T 10/6286* (2013.01); *Y10S 903/93* (2013.01)

(58) Field of Classification Search
CPC ..... B60W 20/40; B60W 10/02; B60W 10/06; B60W 10/08; Y02T 10/6286; Y02T 10/6221; Y10S 903/93
See application file for complete search history.

(56) References Cited

U.S. PATENT DOCUMENTS 6,010,428 A   1/2000   Hoshiya et al.
(Continued)

FOREIGN PATENT DOCUMENTS

| JP | 11-013869 A | 1/1999 |
| JP | 2007069789 A | 3/2007 |
| JP | 2008207643 A | 9/2008 |

OTHER PUBLICATIONS

Machine Translation of Japanese Publication No. 2008-207643 A; Published Sep. 11, 2008.

*Primary Examiner* — Spencer Patton
*Assistant Examiner* — Robert Nguyen
(74) *Attorney, Agent, or Firm* — Dinsmore & Shohl LLP

(57) ABSTRACT

The embodiments described herein relate to control apparatuses for hybrid vehicles which permit starting of an engine and a shift-down action of a transmission, while assuring a reduction of heat generated by a clutch and an improvement of a response of the hybrid vehicle to a vehicle operator's desire for high drivability. In one embodiment, the control apparatus controls the hybrid vehicle such that, when the transmission is required to be shifted down while the hybrid vehicle is switched from the motor drive mode to the engine drive mode, a rate of change of the input speed of said transmission is lower than when only the shift-down action is required to be performed, such that the rate of change of the input speed is relatively low when the input speed of the transmission to be established upon completion of the shift-down action is relatively high.

7 Claims, 8 Drawing Sheets

(56) References Cited

U.S. PATENT DOCUMENTS

| | | | |
|---|---|---|---|
| 7,766,107 B2* | 8/2010 | Joe et al. ................... 180/65.21 |
| 2007/0056783 A1 | 3/2007 | Joe et al. |
| 2007/0155581 A1* | 7/2007 | Tabata et al. ....................... 477/3 |
| 2008/0176710 A1* | 7/2008 | Nohara ................. F16H 61/061 |
| | | | 477/156 |
| 2012/0094800 A1* | 4/2012 | Suzuki ................... B60K 6/445 |
| | | | 477/3 |
| 2012/0264565 A1* | 10/2012 | Kobayashi ............... B60K 6/48 |
| | | | 477/5 |
| 2014/0221152 A1* | 8/2014 | Tsutsumi .............. B60W 20/40 |
| | | | 477/5 |

* cited by examiner

CONTROL APPARATUS FOR HYBRID VEHICLE

The present specification claims priority to U.S. Provisional Patent Application Ser. No. 61/761,099 filed Feb. 5, 2013 and entitled "CONTROL DEVICE FOR HYBRID VEHICLE," the entirety of which is incorporated by reference herein.

TECHNICAL FIELD

The present specification relates to control apparatuses for hybrid vehicles, and more particularly to a control for switching a drive mode of hybrid vehicles from a motor drive mode to an engine drive mode.

BACKGROUND

Hybrid vehicles may be provided with an engine, an electric motor, a clutch for placing a power transmitting path between the engine and the electric motor in a power transmitting state and a power cutoff state, and a transmission disposed in a power transmitting path between the electric motor and drive wheels. Patent Document 1 discloses an example of such a hybrid vehicle. When this hybrid vehicle is placed in a motor drive mode in which the electric motor is operated as a vehicle drive power source, the clutch is placed in a released state to prevent a dragging state of the engine. When the hybrid vehicle is placed in an engine drive mode in which the engine is operated as a main vehicle drive power source, on the other hand, the clutch is placed in an engaged state to transmit a drive force of the engine to the drive wheels. Patent Document 1 also describes that the vehicle drive mode is switched from the motor drive mode to the engine drive mode, by placing the clutch in a slipping state to increase a speed of the engine with a torque of the electric motor, to start the engine. Patent Document 1 further describes that when an operation amount of an accelerator pedal has been increased to a predetermined value or more in the motor drive mode, the engine is started during a shift-down action of the transmission.

PRIOR ART DOCUMENTS

Patent Documents

Patent Document 1: JP-2008-207643 A
Patent Document 2: JP-2007-69789 A

SUMMARY

A shift-down action of the transmission of the hybrid vehicle causes an increase of an input speed of the transmission compared to the input speed of the transmission prior to the shift-down action, and a consequent increase of an amount of slipping of the clutch during an engine starting control. Accordingly, an amount of heat generated by the clutch during the engine starting control is increased, giving rise to a risk of deterioration of the clutch due to the generated heat. On the other hand, Patent Document 2 discloses a shift-down control to shift down the transmission only after completion of the engine starting control, thereby reducing the amount of heat generated by the slipping action of the clutch and mitigating the deterioration of the clutch due to the generated heat. However, the shift-down action performed after completion of the engine starting control reduces the responsiveness of the vehicle to a vehicle operator's desire for high vehicle drivability. Thus, it has been considered difficult to not only prevent deterioration of the clutch due to the generated heat, but also improve the responsiveness of the to the operator's desire for high vehicle drivability.

The embodiments of the control apparatuses and systems described herein were made in view of the background described above and provide a control apparatus for a hybrid vehicle which includes an engine, an electric motor, a clutch for placing a power transmitting path between the engine and the electric motor in a power transmitting state and a power cutoff state, and a transmission disposed in a power transmitting path between the electric motor and drive wheels, and which permits not only a reduction of an amount of heat generated by the clutch, but also improves the responsiveness of the hybrid vehicle to a vehicle operator's desire for high drivability of the vehicle when the engine is required to be started while the transmission is required to be shifted down.

The object indicated above is achieved, according to a first aspect which provides a control apparatus for (a) a hybrid vehicle provided with an engine, an electric motor, a clutch for placing a power transmitting path between the engine and the electric motor in a power transmitting state and a power cutoff state, and a transmission disposed in a power transmitting path between the electric motor and drive wheels, (b) wherein the hybrid vehicle is switchable between a motor drive mode in which the hybrid vehicle is driven with the electric motor being used as the vehicle drive power source while the clutch is placed in a released state, and an engine drive mode in which the hybrid vehicle is driven with the engine being used as a main vehicle drive power source while the clutch is placed in an engaged state, (c) and wherein an operating speed of the engine is increased by the electric motor in a slipping state of the clutch when the hybrid vehicle is switched from the motor drive mode to the engine drive mode, the clutch being brought from the slipping state into a fully engaged state, (d) the control apparatus being characterized by controlling the hybrid vehicle such that when the automatic transmission is required to be shifted down while the hybrid vehicle is required to be switched from the motor drive mode to the engine drive mode, a rate of change of an input speed of the transmission during a shift-down action of the transmission is lower than when only the shift-down action is required to be performed, such that the rate of change is relatively low when the input speed of the transmission to be established upon completion of the shift-down action is relatively high than when it is relatively low.

The control apparatus according to the first aspect is configured such that the rate of change of the input speed of the transmission to be increased by the shift-down action is relatively low when the input speed of the transmission to be established upon completion of the shift-down action is relatively high than when the input speed of the transmission to be established is relatively low, so that the speed of the engine has been increased to a speed of the electric motor when the speed of the engine is relatively low. Accordingly, the amount of slipping of the clutch is reduced, and the deterioration of the clutch due to heat generated by the slipping of the clutch can be prevented. Further, the rate of change of the input speed is not so low when the input speed of the transmission to be established upon completion of the shift-down action is relatively low, so that the completion of the shift-down action will not be delayed, whereby the vehicle response to the operator's desire for high vehicle drivability is improved. Thus, the change of the rate of change of the input speed of the transmission depending upon the input speed to be established upon completion of the shift-down action permits not only the mitigation of the deterioration of the clutch due to the generated heat, but also improves the responsiveness of the vehicle to the operator's desire for high vehicle drivability.

According to one embodiment, the rate of change of the input speed of the transmission is relatively low when a temperature of the clutch is relatively high than when the temperature of the clutch is relatively low. The clutch temperature to be established upon completion of the engine starting control is relatively high when the clutch temperature upon initiation of the shift-down action is relatively high than when the clutch temperature is relatively low, so that it is required to reduce the amount of heat generated due to a slipping action of the clutch when the clutch temperature is relatively high. In view of this fact, the rate of change of the input speed is made relatively low when the clutch temperature is relatively high than when the clutch temperature is relatively low, so that the engine speed has been increased to the electric motor speed when the engine speed is relatively low, whereby the amount of slipping of the clutch is reduced. Accordingly, the amount of generation of heat by the clutch is further reduced, and the deterioration of the clutch due to the generated heat is adequately prevented.

According to another embodiment, after the clutch has been brought into the fully engaged state during the shift-down action, the input speed of the transmission is changed at the same rate as in the case where only the shift-down action is required to be performed. After the clutch has been brought into its fully engaged state during the shift-down action, heat is no longer generated by the clutch, so that the input speed is changed at the same rate as in the case of the normal shift-down action, whereby the vehicle response to the operator's desire for high vehicle drivability can be improved.

According to a further embodiment, the rate of change of the input speed of the transmission is decreased by holding a hydraulic pressure of a releasing-side clutch of the transmission to be released for performing the shift-down action at a higher value than in the case where only the shift-down action is required to be performed. The shifting-down speed of the transmission is decreased by holding the hydraulic pressure of the releasing-side clutch at the higher value. Thus, the rate of change of the input speed can be easily decreased.

According to a still further embodiment, the rate of change of the input speed of the transmission during the shift-down action is decreased when the input speed of the transmission to be established upon completion of the shift-down action is greater than a predetermined threshold value. When the input speed of the transmission to be established upon completion of the shift-down action is not greater than the predetermined threshold value, the input speed of the transmission is changed at the normal rate, so that the shift-down action is not delayed, and the vehicle response to the operator's desire for high vehicle drivability is improved. It is noted that when the input speed to be established upon completion of the shift-down action is not greater than the predetermined threshold value, the amount of slipping of the clutch and the amount of heat generated by the clutch are small without having to decrease the rate of change of the input speed, so that the deterioration of the clutch due to the generated heat is prevented.

According to a yet further embodiment, the vehicle is driven in the engine drive mode, with an assisting drive force generated by the electric motor in addition to a drive force of the engine as a driving source.

DETAILED DESCRIPTION

Embodiments of control apparatuses and systems will be described in detail herein by reference to the drawings. In the embodiments described below, the drawings are simplified or otherwise modified to assist in describing various embodiments, and may not necessarily accurately represent the dimensions and shapes of various elements of the embodiments.

First Embodiment

Figure 1:
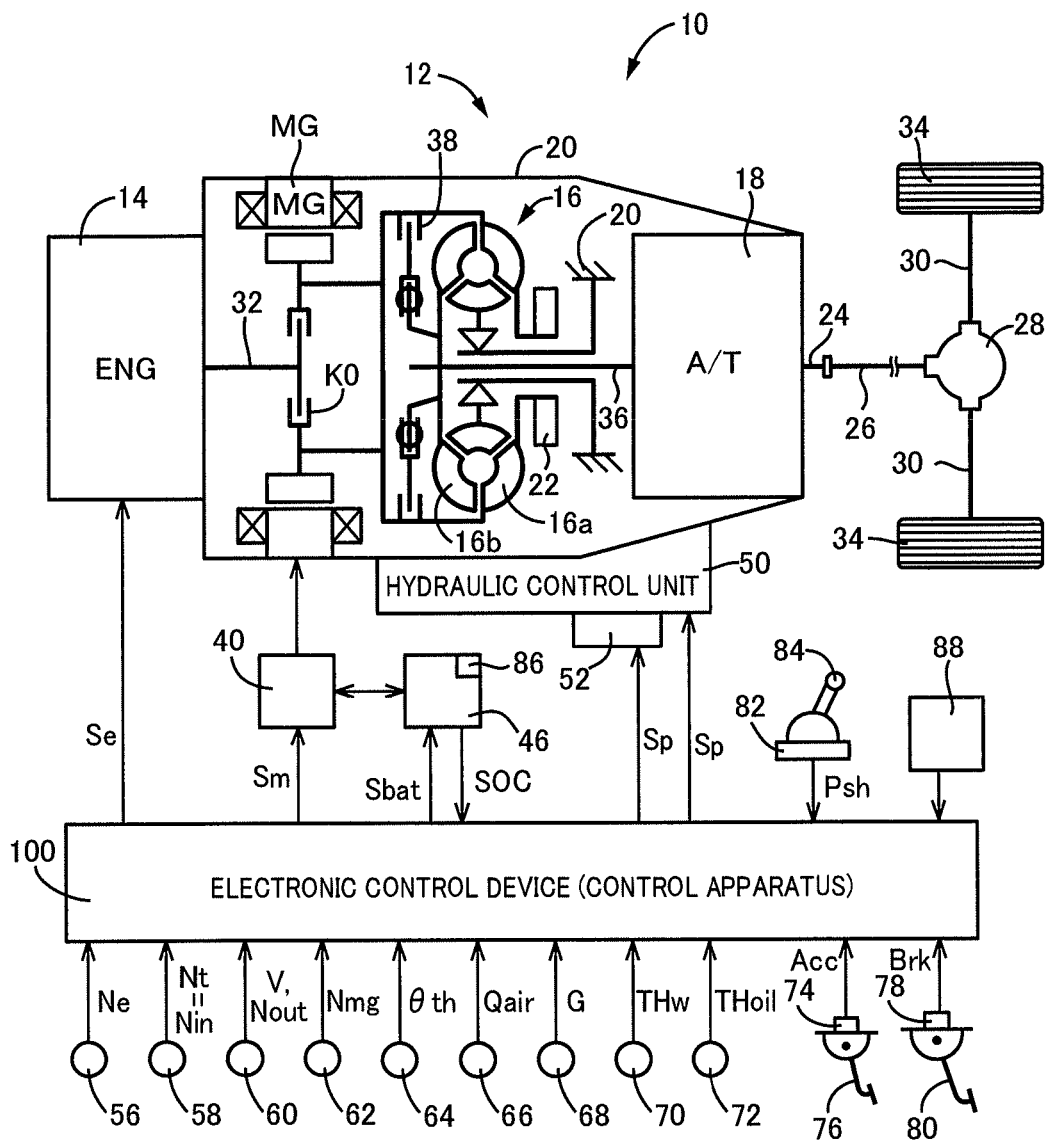
FIG. 1 schematically depicts an arrangement of a power transmitting path from an engine and an electric motor to drive wheels of a hybrid vehicle to which the embodiments of control apparatuses and systems described herein are suitably applicable, and major portions of a control system provided on the hybrid vehicle for implementing an output control of the engine functioning as a vehicle drive power source, a shifting control of an automatic transmission, a driving control of the electric motor, etc.

FIG. 1 schematically depicts an arrangement of a power transmitting path from an engine 14 and an electric motor MG to drive wheels 34 of a hybrid vehicle 10 (hereinafter referred to simply as "vehicle 10") to which the control apparatuses and systems described herein are suitably applicable, and major portions of a control system provided on the vehicle 10 for implementing an output control of the engine 14 functioning as a vehicle drive power source, a shifting control of an automatic transmission 18, a driving control of the electric motor MG, etc.

As shown in FIG. 1, a vehicular power transmitting system 12 (hereinafter referred to as "power transmitting system 12") is provided with an engine connecting/disconnecting clutch K0, the electric motor MG, a torque converter 16, an oil pump 22, and the automatic transmission 18, which are disposed within a transmission casing 20 (hereinafter referred to as "casing 20") as a non-rotary member, in the order of description from the side of the engine 14. The casing 20 is bolted or otherwise attached to a body of the vehicle. The power transmitting system 12 is provided with: a propeller shaft 26 connected to an output shaft 24 which is an output rotary member of the automatic transmission 18; a differential gear device 28 connected to the propeller shaft 26; and a pair of axles 30 connected to the differential gear device 28. The power transmitting system 12 constructed as described above is, for example, suitably used for the vehicle 10 of an FR-type vehicle (Front-engine Rear drive). In the power transmitting system 12, a drive force of the engine 14 is transmitted from an engine connecting shaft 32 connecting the engine 14 and the engine connecting/disconnecting clutch K0 to each other, to a pair of drive wheels 34 through the engine connecting/disconnecting clutch K0, torque converter 16, automatic transmission 18, propeller shaft 26, differential gear device 28 and pair of axles 30, in this order of description, when the engine connecting/disconnecting clutch K0 is placed in its engaged state.

The torque converter 16 is a fluid-operated power transmitting device constructed to transmit a drive force received by a pump impeller 16*a*, to the automatic transmission 18 through a fluid. The pump impeller 16*a* is connected to the engine 14 through the engine connecting/disconnecting clutch K0 and the engine connecting shaft 32 in this order of description, and is an input rotary element which receives the drive force from the engine 14 and is rotatable about its axis. The torque converter 16 has a turbine impeller 16*b* as its output rotary element, which is splined or otherwise connected to a transmission input shaft 36 such that the turbine impeller 16*b* is not rotatable relative to the transmission input shaft 36, which is an input rotary member of the automatic transmission 18. The torque converter 16 is provided with a lock-up clutch 38, which is a clutch disposed between the pump impeller 16*a* and the turbine impeller 16*b*, for directly connecting these impellers 16*a*, 16*b* to each other. The lock-up clutch 38 is hydraulically controlled, for example, and may be placed in one of an engaged state, a slipping state and a released state.

The electric motor MG is a so-called "motor/generator" which functions as a motor operable to convert electric energy into a mechanical drive force, and as an electric generator operable to convert mechanical energy into electric energy. In other words, the electric motor MG can function as a vehicle drive power source which generates a vehicle drive force, in place of, or in addition to the engine 14 which may also provide a vehicle drive power source. The electric motor MG is driven with the drive force generated by the engine 14, or with a force (mechanical energy) received from the drive wheels 34, to perform a regenerative operation for generating electric energy which is stored in an electric energy storage device in the form of a battery 46, through an inverter 40 and a booster converter (not shown). The electric motor MG is operatively connected to the pump impeller 16*a* such that a drive force is transmitted between the electric motor MG and the pump impeller 16*a*. Thus, like the engine 14, the electric motor MG is operatively connected to the transmission input shaft 36. The electric motor MG is connected to the battery 46 through the inverter 40 and the booster converter (not shown) so that the electric motor MG supplies and receives electric energy to and from the battery 46. When the electric motor MG is used as the vehicle drive power source, the engine connecting/disconnecting clutch K0 is placed in the released state, and the drive force of the electric motor MG is transmitted to the pair of drive wheels 34 through the torque converter 16, automatic transmission 18, propeller shaft 26, differential gear device 28 and pair of axles 30, in this order of description.

The oil pump 22 is a mechanically operated oil pump connected to the pump impeller 16*a* and driven by the engine 14 (or the electric motor MG), to deliver a pressurized oil for shifting the automatic transmission 18, for controlling a torque capacity of the lock-up clutch 38, for placing the engine connecting/disconnecting clutch K0 in its engaged or released state, and for lubricating various portions of the power transmitting paths of the vehicle 10. The power transmitting system 12 is also provided with an electrically operated oil pump 52 operated by an electric motor (not shown), as an auxiliary oil pump, to generate a hydraulic pressure, while the oil pump 22 is at rest, for instance, while the vehicle is stationary.

The engine connecting/disconnecting clutch K0 is a hydraulically operated frictional coupling device of a wet multiple-disc type having a plurality of friction plates which are superposed on each other and forced against each other by a hydraulic actuator, for example. The engine connecting/disconnecting clutch K0 is selectively placed in the engaged and released states with the hydraulic pressure generated by the oil pump 22 or the electrically operated oil pump 52, under the control of a hydraulic control unit 50 provided in the power transmitting system 12. When the engine connecting/disconnecting clutch K0 is brought into the engaged or released state, a power-transmissible torque capacity of the clutch K0, that is, an engaging force of the clutch K0 is continuously changed with hydraulic pressure regulation by linear solenoid valves incorporated within the hydraulic control unit 50, for example. The engine connecting/disconnecting clutch K0 has a pair of rotary members (a clutch hub and a clutch drum) which are rotatable relative to each other when the clutch K0 is placed in the released state. One of these rotary members, namely, the clutch hub, is connected to the engine connecting shaft 32 such that the clutch hub is rotated with the engine connecting shaft 32, while the other of the rotary members, namely, the clutch drum, is connected to the pump impeller 16*a* of the torque converter 16 such that the clutch drum is rotated with the pump impeller 16*a*. When the thus constructed engine connecting/disconnecting clutch K0 is placed in the engaged state, the pump impeller 16*a* is rotated with the engine 14 via the engine connecting shaft 32. That is, the drive force of the engine 14 is transmitted to the pump impeller 16*a* in the engaged state of the engine connecting/disconnecting clutch K0. When the engine connecting/disconnecting clutch K0 is placed in the released state, on the other hand, the pump impeller 16*a* is disconnected from the engine 14. Since the electric motor MG is operatively connected to the pump impeller 16*a* as described above, the engine connecting/disconnecting clutch K0 also functions as a clutch for placing a power transmitting path between the engine 14 and the electric motor MG in a power transmitting state and a power cutoff state. In the present embodiment, the engine connecting/disconnecting clutch K0 is a so-called "normally open type" clutch in which the torque capacity (engaging force) of the clutch increases with an increase of the hydraulic pressure, and which is brought into its released state when the hydraulic pressure is not applied thereto.

The automatic transmission 18 is operatively connected to the electric motor MG, without the engine connecting/disconnecting clutch K0 being interposed therebetween, and constitutes a part of a power transmitting path between the engine 14 and the drive wheels 34, and a part of a power transmitting path between the electric motor MG and the drive wheels 34, so that the automatic transmission 18 functions to transmit the drive forces of the vehicle drive power sources (i.e., the engine 14 and the electric motor MG) to the drive wheels 34. The automatic transmission 18 is a planetary gear type multiple-step transmission functioning as a step-variable automatic transmission having a plurality of shift positions (gear positions) which are selectively established by engaging and releasing actions of respective combinations of hydraulically operated frictional coupling devices such as clutches and brakes. That is, the automatic transmission 18 is a conventional step-variable transmission which is configured to perform so-called "clutch-to-clutch shifting" actions, for changing, in steps, the ratio of the rotating speed of an output shaft 24 with respect to the rotating speed of a transmission input shaft 36. The transmission input shaft 36 is a turbine shaft rotated by the turbine impeller 16b of the torque converter 16. The automatic transmission 18 is shifted to a selected one of the gear positions (shift positions) with the engaging and releasing actions of the clutches and brakes, according to an amount of operation of an accelerator pedal by the vehicle operator and a running speed V of the vehicle. When all of the clutches and brakes are placed in the released state, the automatic transmission 18 is placed in its neutral state in which the power transmitting paths between the engine 14 and electric motor MG and the drive wheels 34 are placed in the power cutoff state. It is noted that the automatic transmission 18 is a transmission provided in a power transmitting path between the engine and the drive wheels according to the embodiments described herein.

Referring back to FIG. 1, the vehicle 10 is provided with an electronic control device 100 including various control portions such as a hybrid drive control portion. In the embodiments described herein, the electronic control device 100 may include a processor and a memory storing a computer readable and executable instruction set which, when executed by the processor, controls the various functions of the hybrid vehicle, including, without limitation, the hybrid drive control portion. For instance, the electronic control device 100 includes a so-called microcomputer incorporating a CPU, a RAM, a ROM and an input-output interface. The CPU performs signal processing operations according to programs stored in the ROM, while utilizing a temporary data storage function of the RAM, to implement various controls of the vehicle 10. For example, the electronic control device 100 is configured to implement an output control of the engine 14, a regenerative control and other drive controls of the electric motor MG, a shifting control of the automatic transmission 18, a torque capacity control of the lock-up clutch 38, and a torque capacity control of the engine connecting/disconnecting clutch K0. The electronic control device 100 is constituted by a plurality of control units, as needed, such as an engine control unit, an electric motor control unit and a hydraulic control unit (a shifting control unit).

The electronic control device 100 receives various input signals such as: an output signal of an engine speed sensor 56 indicative of an operating speed Ne of the engine 14; an output signal of a turbine speed sensor 58 indicative of a rotating speed Nt of the turbine impeller 16b of the torque converter 16, which is an input speed of the automatic transmission 18, namely, a rotating speed Nin of the transmission input shaft 36; an output signal of an output shaft speed sensor 60 indicative of a rotating speed Nout of the output shaft 24 which is a vehicle-speed related value and which corresponds to the vehicle running speed V and the rotating speed of the propeller shaft 26; an output signal of an electric motor speed sensor 62 indicative of an operating speed Nmg of the electric motor MG; an output signal of a throttle sensor 64 indicative of an opening angle θth of an electronic throttle valve (not shown); an output signal of an intake air quantity sensor 66 indicative of an intake air quantity Qair of the engine 14; an output signal of an acceleration sensor 68 indicative of a longitudinal acceleration value G (or longitudinal deceleration value G) of the vehicle 10; an output signal of a cooling water temperature sensor 70 indicative of a cooling water temperature THw of the engine 14; an output signal of an oil temperature sensor 72 indicative of a temperature THoil of a working oil in the hydraulic control unit 50; an output signal of an accelerator opening angle sensor 74 indicative of an operation amount Acc of an accelerator pedal 76, which is a drive force of the vehicle 10 required by the vehicle operator (an operator required vehicle output); an output signal of a foot brake sensor 78 indicative of an operation amount Brk of a brake pedal 80, which is a braking force of the vehicle 10 required by the vehicle operator (an operator required vehicle deceleration value); an output signal of a shift position sensor 82 indicative of a shift position (operating position) Psh of a shift lever 84, which is a selected one of a plurality of known shift lever positions "P", "N", "D", "R" and "S"; and an output signal of a battery sensor 86 indicative of a stored electric energy amount (charged or residual energy amount) SOC of the battery 46. The electronic control device 100 is supplied with electric energy by an auxiliary battery 88, for example, through a DC-DC converter (not shown) provided to lower the voltage of the electric energy.

The electronic control device 100 generates various signals such as: engine output control command signals Se to control the output of the engine 14; an electric motor control command signal Sm for controlling the operation of the electric motor MG; and hydraulic control command signals Sp for controlling solenoid valves incorporated in the hydraulic control unit 50 to control the hydraulic actuators of the engine connecting/disconnecting clutch K0 and the clutches and brakes of the automatic transmission 18, and for controlling the electrically operated oil pump 52.

Figure 2:
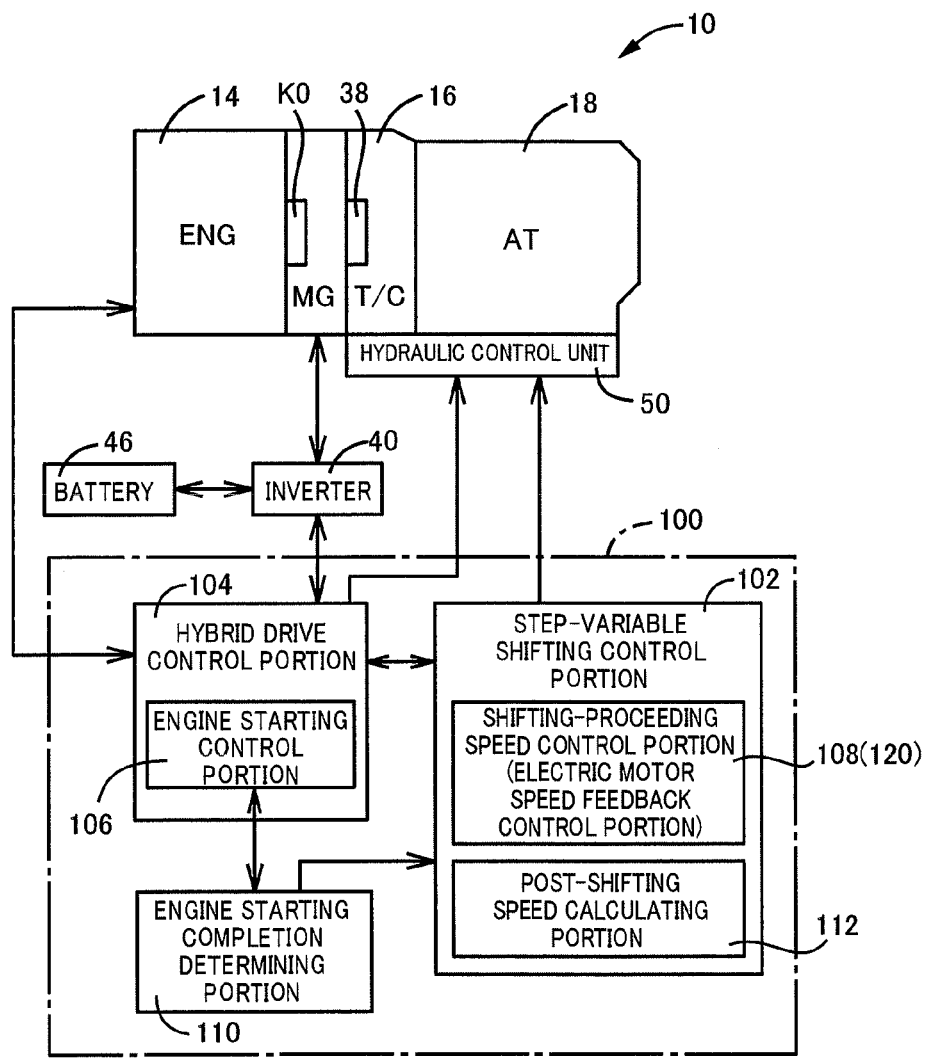
FIG. 2 is a block diagram of major control functions of an electronic control device of FIG. 1.

FIG. 2 is a functional block diagram of the major control functions of the electronic control device 100. Step-variable shifting control means in the form of a step-variable shifting control portion 102 controls the shifting actions of the automatic transmission 18. The step-variable shifting control portion 102 is configured to determine whether a shifting action of the automatic transmission 18 should be performed, that is, to determine the shift position to which the automatic transmission 18 should be shifted. This determination is made on the basis of the vehicle running condition as represented by the actually detected vehicle running speed V and accelerator pedal operation amount Acc (or transmission output torque Tout), for example, and according to a known predetermined relationship (shifting map) stored in a memory as shift-up and shift-down lines determined in relation to the vehicle running speed V and accelerator pedal operation amount Acc used as variables. The step-variable shifting control portion 102 implements an automatic shifting control of the automatic transmission 18 to establish the determined shift position. For example, the step-variable shifting control portion 102 determines that a shift-down action of the automatic transmission 18 is required if the accelerator pedal operation amount Acc (i.e., the required vehicle drive torque) has exceeded a value represented by any one of the shift-down lines to the high accelerator opening angle side (the high required vehicle drive torque side) as a result of an increase of the operation amount Acc of the accelerator pedal 76. In this case, the step-variable shifting control portion 102 implements a shift-down control to command the automatic transmission 18 to perform a shift-down action corresponding to the above-indicated one of the shift-down lines. That is, the step-variable shifting control portion 102 supplies the hydraulic control unit 50 with the hydraulic control command signals (shifting output command, hydraulic pressure command) Sp for engaging and releasing the coupling devices selected to achieve the desired shifting step according to a predetermined table of operating states of the coupling devices that is previously stored in relation to the shift positions of the automatic transmission 18, for example. The hydraulic control unit 50 controls the linear solenoid valves incorporated therein, according to the received hydraulic control command signals Sp, to operate the hydraulic actuators of the selected coupling devices so that the coupling devices are engaged and released, for example, the releasing side clutch is released and the engaging side clutch is engaged, to shift the automatic transmission 18 to the determined shift position.

A hybrid drive control portion 104 (hybrid drive control means) 104 functions as an engine drive control portion for controlling the operation of the engine 14, and as an electric motor control portion for controlling the operation of the electric motor MG as a vehicle drive power source or as an electric generator through the inverter 40. The hybrid drive control portion 104 performs those functions to implement hybrid drive controls of the engine 14 and the electric motor MG. For example, the hybrid drive control portion 104 calculates the required vehicle drive torque on the basis of the accelerator pedal operation amount Acc and the vehicle running speed V, and controls the vehicle drive power sources (engine 14 and electric motor MG) so as to generate a total output torque corresponding to the calculated required vehicle drive torque, while taking into account a power transmitting loss, a load acting on each accessory device in operation, the presently established shift position of the automatic transmission 18, the stored electric energy amount SOC of the battery 46, etc.

Described more specifically, when the calculated required vehicle drive torque can be obtained by only an output torque Tmg of the electric motor MG (electric motor torque Tmg), for instance, the hybrid drive control portion 104 selects a motor drive mode (hereinafter referred to as "EV drive mode") in which only the electric motor MG is operated as the vehicle drive power source. When at least an output torque Te of the engine 14 is needed to obtain the calculated required vehicle drive torque, on the other hand, the hybrid drive control portion 104 selects an engine drive mode in which at least the engine 14 is operated as the vehicle drive power source. Thus, the hybrid drive control portion 104 selects the EV drive mode or the engine drive mode as the vehicle drive mode.

To establish the EV drive mode, the hybrid drive control portion 104 commands the engine connecting/disconnecting clutch K0 to be placed in the released state, placing the power transmitting path between the engine 14 and the torque converter 16 in the power cutoff state. In the EV drive mode, the hybrid drive control portion 104 controls the electric motor MG to generate the electric motor torque Tmg required for running the vehicle in the EV drive mode. To establish the engine drive mode, on the other hand, the hybrid drive control portion 104 commands the engine connecting/disconnecting clutch K0 to be placed in the engaged state, transmitting the drive force of the engine 14 to the pump impeller 16*a*. In the engine drive mode, the hybrid drive control portion 104 controls the electric motor MG to generate an assisting vehicle drive torque, as needed. While the oil pump 22 is at rest in a stationary state of the vehicle, for example, the hybrid drive control portion 104 operates the electrically operated oil pump 52 as the auxiliary oil pump, to generate the required hydraulic pressure.

The hybrid drive control portion 104 also functions as a regenerative control during coasting of the vehicle in the non-operated state of the accelerator pedal or during braking of the vehicle by operation of the brake pedal 80. Namely, the hybrid drive control portion 104 controls the electric motor MG to be operated as the electric generator using the kinetic energy of the running vehicle 10, that is, with a reverse drive force transmitted from the drive wheels 34 toward the engine 14, converting the kinetic energy into an electric energy to be stored in the battery 46 through the inverter 40 in order to improve the fuel economy of the vehicle. The amount of regeneration of the electric energy by the electric motor MG under the control of the hybrid drive control portion 104 is determined according to the stored electric energy amount SOC of the battery 46, and a portion of the total braking force corresponding to the brake pedal operation amount, which portion is assigned to a hydraulically operated braking system.

The hybrid drive control portion 104 is functionally provided with an engine starting control portion 106 (engine starting control means) for starting the engine 14 to switch the vehicle drive mode from the EV drive mode to the engine drive mode if the required vehicle drive torque is increased as a result of an increase of the operation amount of the accelerator pedal 76 in the EV drive mode, for example, to a value that is higher than a maximum value of the electric motor torque Tmg that can be obtained in the EV drive mode according to the required vehicle drive torque. For starting the engine 14, the engine starting control portion 106 places the engine connecting/disconnecting clutch K0 in the slipping state and gradually brings the clutch K0 into the fully engaged state so that an engine starting torque Tmgs for starting the engine is transmitted from the electric motor MG to the engine through the clutch K0 in the slipping state to rotatably drive the engine 14, to increase the engine speed Ne for synchronization with the electric motor speed Nmg. In the fully engaged state, the engine connecting/disconnecting clutch K0 does not have a slipping action. When the engine speed Ne has been increased to a value at which the engine 14 can be operated by itself, the engine starting control portion 106 implements an engine ignition control and a fuel supply control, thereby starting the engine 14. In the fully engaged state of the engine connecting/disconnecting clutch K0, the engine 14 and the electric motor MG are connected to each other so that the engine speed Ne and the electric motor speed Nmg are equal to each other.

The point indicative of the vehicle running condition may move across any shift-down line in the direction requiring a shift-down action of the automatic transmission 18 during the engine starting control by the engine starting control portion 106. Namely, a shift-down action of the automatic transmission 18 may be required during the engine starting control. Where the engine starting control and the control for the shift-down action of the automatic transmission 18 are required concurrently, a rise of the speed Nin of the input shaft 36 of the automatic transmission 18 as a result of the shift-down action causes the engine speed Ne to rise according to the rise of the speed Nin of the input shaft in the engaged state of the lock-up clutch 38, so that the amount of slipping of the engine connecting/disconnecting clutch K0 during the engine starting control is increased, and the amount of heat generated by the engine connecting/disconnecting clutch K0 is accordingly increased, whereby the engine connecting/disconnecting clutch K0 may be deteriorated due to the generated heat.

In view of the problem indicated above, the electronic control device 100 is configured such that when the automatic transmission 18 is required to be shifted down while the vehicle drive mode is required to be switched from the motor drive mode to the engine drive mode (when the engine starting control is required to be implemented), a rate of change of the input speed Nin of the automatic transmission 18 is relatively low when the input speed Nin to be established upon completion of the shift-down action is relatively high than when the input speed Nin is relatively low. Namely, the electronic control device 100 controls the rate of change of the input speed Nin of the automatic transmission such that the rate of rise of the input speed Nin decreases with an increase of the input speed Nin to be established upon completion of the shift-down action, so that the engine speed Ne has been increased to the electric motor speed Nmg during the engine starting control when the engine speed Ne is relatively low. That is, the engine connecting/disconnecting clutch K0 has been brought from its slipping state into its fully engaged state when the engine speed Ne is relatively low, so that the amount of slipping of the engine connecting/disconnecting clutch K0 during the engine starting control is reduced, and the amount of heat generated by the engine connecting/disconnecting clutch K0 is accordingly decreased, whereby the deterioration of the clutch K0 due to the generated heat is prevented. When the input speed Nin of the automatic transmission to be established upon completion of the shift-down action is relatively low, on the other hand, the amount of slipping of the engine connecting/disconnecting clutch K0 is relatively small without having to lower the rate of change of the input speed Nin of the automatic transmission, so that the engine connecting/disconnecting clutch K0 will not be deteriorated due to the generated heat, and the shift-down action of the automatic transmission 18 will not be delayed, whereby the vehicle response to the operator's desire for high vehicle drivability is improved. The control of the rate of change of the input speed Nin of the automatic transmission will be described in further detail herein. It is noted that the following description is based on an assumption that the lock-up clutch 38 is placed in the engaged state. When the lock-up clutch 38 is in the engaged state, the turbine impeller 16b and the pump impeller 16a are connected to each other, so that the speed Nin of the transmission input shaft 36 and the electric motor speed Nmg are equal to each other.

Referring again to FIG. 2, a shifting proceeding speed control portion 108 (shifting speed control means) is configured to control a shift-down speed of the automatic transmission 18 such that the shift-down speed is relatively low when the automatic transmission 18 is required to be shifted down while the vehicle drive mode is required to be switched from the motor drive mode to the engine drive mode (with the engine starting control), than when the shift-down action is controlled in a normal manner. In the present embodiment, "the shift-down action controlled in a normal manner" means the shift-down action is not controlled as described above by the shifting proceeding speed control portion 108. In other words, the shift-down action is controlled in a normal manner when the shift-down control of the automatic transmission 18 is required without the concurrent requirement for the engine starting control. The rate of change of the speed Nin of the transmission input shaft 36 is relatively high when the shift-down speed of the automatic transmission 18 is relatively high, and is relatively low when the shift-down speed of the automatic transmission is relatively low. Accordingly, the shifting proceeding speed control portion 108 controls the rate of change of the speed Nin of the input shaft 36 of the automatic transmission 18 such that the rate of change is relatively low when the engine starting control and the shift-down control of the automatic transmission 18 are concurrently required, than when the shift-down control is required under normal conditions. Described more specifically, the shifting proceeding speed control portion 108 controls (adjusts) a hydraulic pressure Pout of a releasing-side clutch to be released for the shift-down action such that the hydraulic pressure Pout is held at a comparatively high value when the shift-down control is required concurrently with the engine starting control, than when the shift-down control is required under normal conditions, so that the speed Nin of the transmission input shaft 36 is changed at a relatively low rate. When the hydraulic pressure Pout of the releasing-side clutch is held at the comparatively high value, the torque capacity of the releasing-side clutch is held at a comparatively high value, so that the shift-down speed is lowered, and the rate of change of the input speed Nin is accordingly lowered.

Where the speed Nin of the transmission input shaft 36 is changed at the relatively low rate, the engine speed Ne and the electric motor speed Nmg (namely, the input speed Nin) become equal to each other when the input speed Nin is relatively low. Accordingly, the amount of slipping of the engine connecting/disconnecting clutch K0 during the engine starting control is decreased, relative to when the shift-down action is controlled in the normal manner, so that the amount of heat generated by the engine connecting/disconnecting clutch K0 is decreased. In the shift-down action controlled in the normal manner, the engine speed Ne is increased to the input speed Nin to be established upon completion of the shift-down action, by the slipping action of the clutch K0, so that the amount of slipping of the clutch K0 and the amount of heat generated by the clutch K0 are relatively large.

Figure 3:
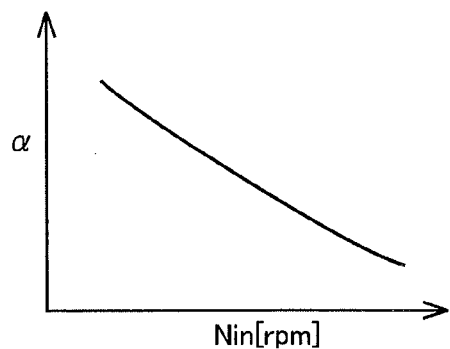
FIG. 3 graphically depicts the relationship between an input speed of the transmission to be established as a result of a shift-down action, and a rate of change of the input speed.

A rate of change cc of the input speed Nin of the automatic transmission 18 during the shift-down action (in the inertia phase) is set to decrease with an increase of the input speed Nin to be established upon completion of the shift-down action. Namely, the rate of change cc is determined such that the input speed Nin of the automatic transmission is changed at a relatively low rate when the input speed Nin to be established upon completion of the shift-down action is relatively high than when it is relatively low. The input speed Nin to be established upon completion of the shift-down action is calculated by a post-shifting speed calculating portion 112. The post-shifting speed calculating portion 112 is configured to calculate the input speed Nin of the automatic transmission 18 to be established upon completion of the shift-down action by obtaining a product of the output speed Nout (corresponding to the vehicle running speed V) and a gear ratio γR of the automatic transmission 18 to be established as a result of the shift-down action. After calculation of the input speed Nin to be established upon completion of the shift-down action, the shifting proceeding speed control portion 108 determines the change rate α on the basis of the calculated input speed Nin, and according to a predetermined relationship represented by a map stored in a memory and shown in FIG. 3. The map relates the change rate α and the input speed Nin to be established upon completion of the shift-down action. As is apparent from FIG. 3, the change rate cc is relatively low when the input speed Nin to be established upon completion of the shift-down action is relatively high than when the input speed Nin to be established upon completion of the shift-down action is relatively low. Namely, the input speed Nin is changed at a relatively low rate when the input speed Nin to be established upon completion of the shift-down action is relatively high than when it is relatively low. For example, the shifting proceeding speed control portion 108 stores therein a map representing a predetermined relationship between the change rate cc and the hydraulic pressure Pout (commanded pressure value) of the releasing-side clutch, and determines the hydraulic pressure Pout on the basis of the change rate $\alpha$ and according to the predetermined relationship. The shifting proceeding speed control portion 108 commands the hydraulic control unit 50 to hold the clutch at the determined hydraulic pressure Pout. Alternatively, the shifting proceeding speed control portion 108 calculates a target value Nin* of the input speed Nin on the basis of the change rate $\alpha$, and implements a feedback control of the hydraulic pressure Pout of the releasing-side clutch, such that the input speed Nin is changed to the target value Nin*. In this manner, the hydraulic pressure Pout is held at a higher value than when the shift-down action is controlled in the normal manner.

When the engine starting control is completed during the shift-down action, namely, when the engine connecting/disconnecting clutch K0 has been brought into its fully engaged state during the shift-down action, the shifting proceeding speed control portion 108 changes the speed Nin of the input shaft 36 of the automatic transmission 18 in the same manner as in the case of the normal shift-down action, so that the delay of the shift-down action is reduced, and the deterioration of the vehicle response to the operator's desire for high vehicle drivability is minimized. The determination as to whether the engine starting control is completed or not is made by an engine starting completion determining portion 110 (engine starting completion determining means). The engine starting completion determining portion 110 is configured to calculate, from time to time, a difference $\Delta N$ (=Nmg−Ne) between the engine speed Ne and the electric motor speed Nmg, and determine that the engine starting control is completed when the difference $\Delta N$ has been reduced to or below a predetermined value $\beta$. This predetermined value $\beta$ is low enough to determine that the engine speed Ne and the electric motor speed Nmg have become equal to each other, namely, that the engine connecting/disconnecting clutch K0 is in a non-slipping state. The engine connecting/disconnecting clutch K0 in the non-slipping state is placed in its fully engaged state.

Figure 4:
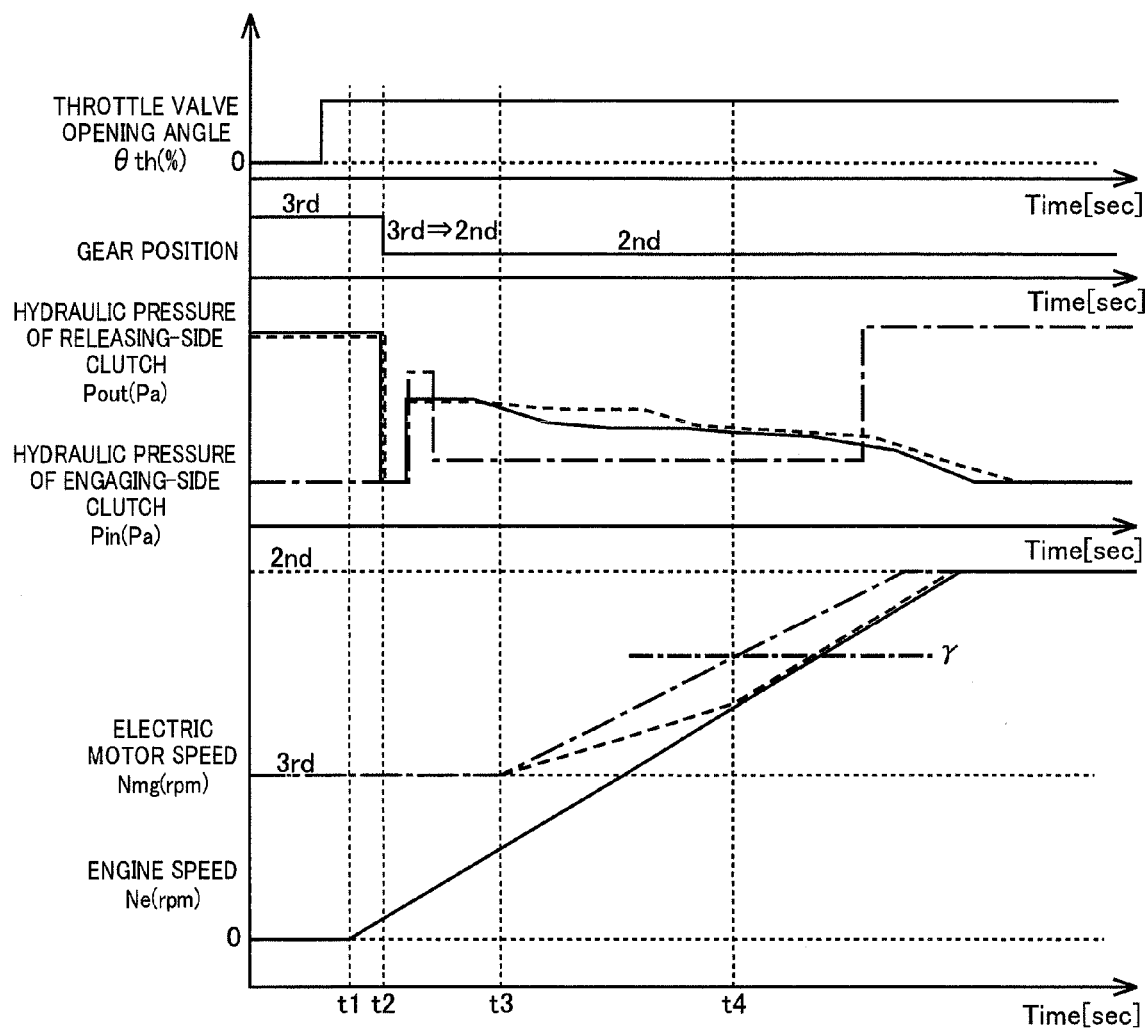
FIG. 4 graphically depicts a time chart indicating a control operation of a shifting proceeding speed control portion of FIG. 2.

FIG. 4 graphically depicts a time chart indicating the control operation of the shifting proceeding speed control portion 108. In the example of FIG. 4, the automatic transmission is shifted down from a third gear position to a second gear position.

In the example of FIG. 4, the requirement for switching the vehicle drive mode from the motor drive mode to the engine drive mode, that is, the requirement for the engine starting control, is determined when the throttle valve opening angle θth has been increased as a result of an operation of the accelerator pedal 76. Upon determination of this requirement, the engine starting control is initiated by the engine starting control portion 106 at a time t1, so that the engine speed Ne is increased with the torque of the electric motor MG in the slipping state of the engine connecting/disconnecting clutch K0. When the determination of the requirement for the shift-down action of the automatic transmission 18 from the third gear position to the second gear position is made at a time t2, the reduction of the hydraulic pressure Pout (commanded pressure value) of the releasing-side clutch is initiated. In FIG. 4, a broken line indicates the hydraulic pressure Pout of the releasing-side clutch according to the present embodiment while a solid line indicates the hydraulic pressure Pout during the normal shift-down action. Further, a hydraulic pressure Pin (commanded pressure value) of the engaging-side clutch to be engaged indicated by a long dashed short dashed line is rapidly increased (for a temporary quick engaging action) and then held at a predetermined stand-by value. The automatic transmission enters into an inertia phase at a time t3, so that the speed Nin of the transmission input shaft 36, and the speed Nmg of the electric motor MG connected to the transmission input shaft 36 through the lock-up clutch 38 are increased. In the present embodiment, the hydraulic pressure Pout of the releasing-side clutch, which is indicated by the broken line, is held at a higher value than the hydraulic pressure Pout during the normal shift-down action, which is indicated by the solid line. In this respect, it is noted that the electric motor speed Nmg of the present embodiment, indicated by a broken line, is increased (changed) at a lower rate than the electric motor speed Nmg during the normal shift-down action, which is indicated by a one-dot chain line.

As a result of the change of the electric motor speed Nmg at the lower rate, the engine speed Ne has been increased to the electric motor speed Nmg at time t4, when the engine speed Ne is relatively low. Described more specifically, the engine speed Ne has reached the electric motor speed Nmg in the inertia phase of the automatic transmission. Accordingly, the amount of slipping of the engine connecting/disconnecting clutch K0 during the engine starting control is reduced, and the amount of heat generated by the engine connecting/disconnecting clutch K0 is reduced. In the normal shift-down action, on the other hand, the engine speed Ne is increased to the electric motor speed Nmg to be established upon completion of the shift-down action, so that the amount of slipping of the engine connecting/disconnecting clutch K0 is comparatively large, and the amount of heat generated by the engine connecting/disconnecting clutch K0 is comparatively large.

After the time t4, the engine connecting/disconnecting clutch K0 is held in the fully engaged state without a slipping action, and the hydraulic pressure Pout of the releasing-side clutch is held at the same value as in the normal shift-down action, and the engine speed Ne and the electric motor speed Nmg are changed at the same rate as in the normal shift-down action. Accordingly, the reduction of the vehicle response to the operator's desire for high vehicle drivability, which is caused by the relatively lower rate of change of the electric motor speed Nmg, is minimized.

Where the input speed Nin to be established upon completion of the shift-down action is relatively low, the amount of slipping of the engine connecting/disconnecting clutch K0 during the engine starting control is accordingly small, so that the rate of change of the speed Nin of the transmission input shaft 36 need not be lowered to prevent a large amount of heat generated by the engine connecting/disconnecting clutch K0. Therefore, the shifting proceeding speed control portion 108 makes the determination as to whether the input speed Nin should be changed at the relatively low rate or not, on the basis of the input speed Nin to be established upon completion of the shift-down action. The input speed Nin to be established upon completion of the shift-down action is calculated by the post-shifting speed calculating portion 112. The shifting proceeding speed control portion 108 determines whether the input speed Nin established upon completion of the shift-down action calculated by the post-shifting speed calculating portion 112 is higher than a predetermined threshold value $\gamma$, and controls the rate of change of the input speed Nin such that the input speed Nin is changed at the relatively low rate, if it is determined that the calculated input speed Nin is greater than the threshold value $\gamma$. It is noted that the threshold value $\gamma$ is previously obtained by experimentation. More specifically, the threshold value $\gamma$ is determined to be a permissible highest value of the engine speed Ne below which the engine connecting/disconnecting clutch K0 will not be deteriorated by the heat generated by its slipping action which causes a rise of the engine speed Ne to the threshold value γ.

Figure 5:
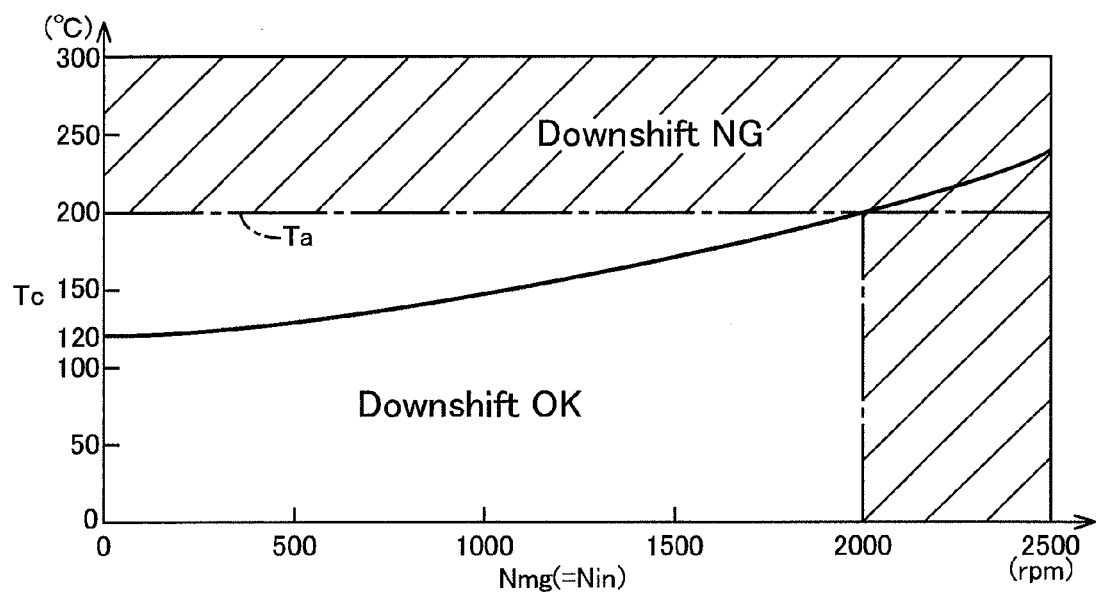
FIG. 5 graphically depicts a relationship between an electric motor speed to be established upon completion of the shift-down action, namely, an input transmission speed upon completion of the shift-down action and a temperature of the engine connecting/disconnecting clutch.

FIG. 5 graphically depicts a relationship between the electric motor speed Nmg to be established upon completion of the shift-down action, namely, the input speed Nin upon completion of the shift-down action, and the temperature Tc of the engine connecting/disconnecting clutch K0. In other words, FIG. 5 shows the temperature Tc of the engine connecting/disconnecting clutch K0 when the engine speed Ne has been increased to the electric motor speed Nmg by the slipping action of the clutch K0. In the example of FIG. 5, the clutch temperature Tc upon initiation of the engine starting control is 120° C.

As indicated by a solid line in FIG. 5, the clutch temperature Tc increases with an increase of the electric motor speed Nmg to be established upon completion of the shift-down action. This is because the amount of slipping of the engine connecting/disconnecting clutch K0, and the amount of heat generated due to the slipping action increases with the increase of the electric motor speed Nmg to be established upon completion of the shift-down action.

As also indicated in FIG. 5, the clutch temperature Tc increases to 200° C. when the electric motor speed Nmg has been increased to 2000 rpm. Where a permissible highest temperature Ta of the engine connecting/disconnecting clutch K0 is 200° C., the clutch temperature Tc has been increased to this permissible highest value Ta when the electric motor speed Nmg has reached 2000 rpm, so that the engine starting control must be completed before the electric motor speed Nmg has reached 2000 rpm. Accordingly, the shifting proceeding speed control portion 108 changes the input speed Nin of the automatic transmission 18 at the relatively low rate when the electric motor speed Nmg to be established upon completion of the shift-down action is 2000 rpm or higher. In this case, the engine speed Ne has been increased to the electric motor speed Nmg, which is lower than 2000 rpm, so that the clutch temperature Tc will not exceed 200° C. It should be understood that the threshold value γ of the electric motor speed Nmg is 2000 rpm. Namely, the clutch temperature Tc exceeds the permissible highest value Ta of 200° C. when the electric motor speed Nmg to be established upon completion of the shift-down action exceeds the threshold value γ of 2000 rpm. In this case, the shifting proceeding speed control portion 108 lowers the rate of change of the input speed Nin, to reduce the amount of slipping of the clutch K0 to prevent an increase of the clutch temperature Tc beyond 200° C. When the electric motor speed Nmg to be established upon completion of the shift-down action is lower than 2000 rpm, on the other hand, the rate of change of the input speed Nin need not be lowered to prevent the rise of the clutch temperature Tc beyond the permissible highest value Ta.

In the example of FIG. 5, the permissible highest temperature Ta is set to be 200° C., so that the threshold value γ is set to be 2000 rpm. This threshold value γ is set where the initial value of the clutch temperature Tc upon initiation of the engine starting control is 120° C. However, the clutch temperature Tc to be established upon completion of the engine starting control changes with the initial value of the clutch temperature Tc upon initiation of the engine starting control although the threshold value γ is the same.

Figure 6:
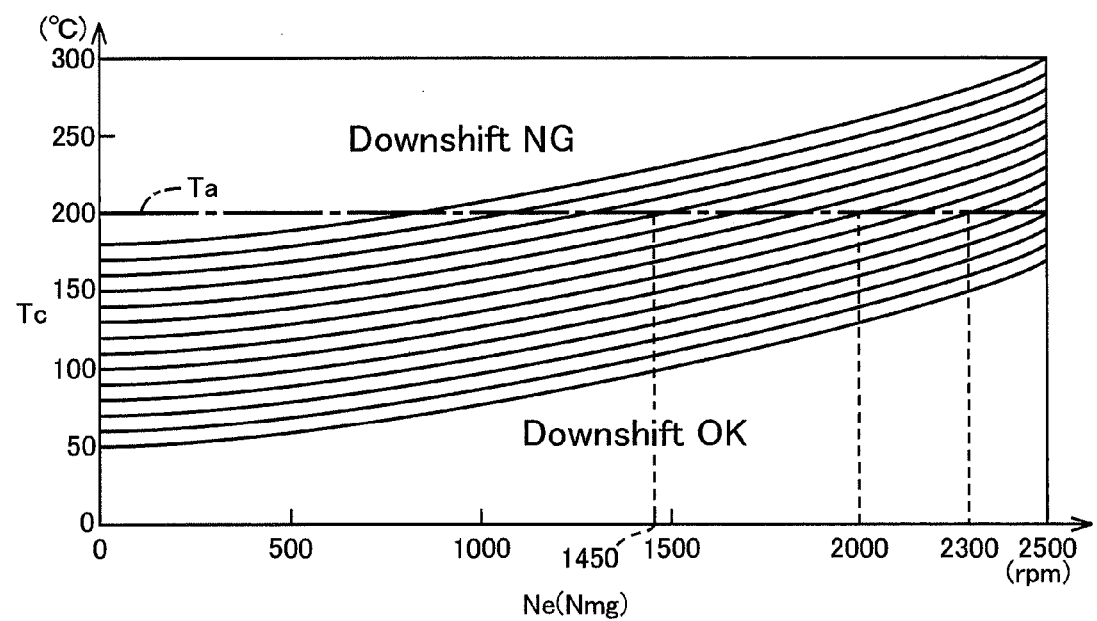
FIG. 6 graphically depicts different relationships between the speed of the engine (speed of the electric motor) and the clutch temperature after the engine starting control, in the respective cases of a plurality of different initial values of the clutch temperature upon initiation of the engine starting control.

FIG. 6 graphically depicts different relationships between the engine speed Ne (electric motor speed Nmg) and the clutch temperature Tc after the engine starting control in the respective cases of a plurality of different initial values of the clutch temperature upon initiation of the engine starting control. The relationships indicated in FIG. 6 include the relationship of FIG. 5 where the initial value of the clutch temperature Tc upon initiation of the engine starting control is 120° C., wherein the clutch temperature Tc is increased to the permissible highest value Ta of 200° C. when the engine speed Ne is increased to 2000 rpm. The relationships of FIG. 6 also include the relationship where the initial value of the clutch temperature Tc upon initiation of the engine starting control is 100° C., wherein the clutch temperature Tc is increased to 200° C. when the engine speed Ne is increased to about 2300 rpm. The relationships of FIG. 6 further include the relationship where the initial value of the clutch temperature Tc upon initiation of the engine starting control is 150° C., wherein the clutch temperature Tc is increased to 200° C. when the engine speed Ne is increased to about 1450 rpm.

Figure 7:
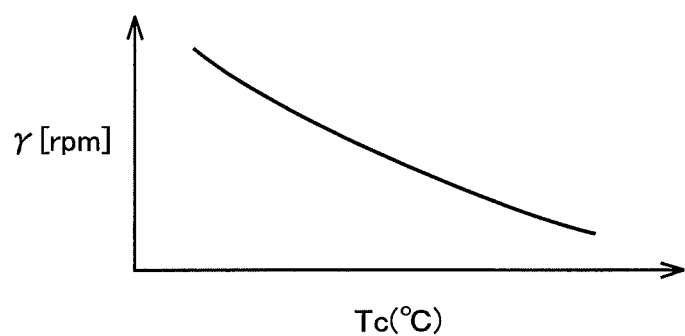
FIG. 7 graphically depicts a relationship between the clutch temperature upon initiation of the engine starting control and a predetermined threshold value of the engine speed.

Thus, the engine speed Ne (electric motor speed Nmg) at which the clutch temperature Tc reaches the permissible highest value Ta of 200° C. after initiation of the engine starting control decreases with an increase of the initial value of the clutch temperature Tc upon initiation of the engine starting control. The values of the engine speed Ne (electric motor speed Nmg) at which the clutch temperature Tc reaches the permissible highest value Ta of 200° C. are set as the threshold value γ. This threshold value γ is set so as to decrease with an increase of the initial value of the clutch temperature Tc upon initiation of the engine starting control. FIG. 7 graphically depicts a relationship between the clutch temperature Tc upon initiation of the engine starting control, and the threshold value γ. This relationship of FIG. 7 is obtained by plotting points of the engine speed Ne at which the clutch temperature Tc upon initiation of the engine starting control in FIG. 6 is increased from the respective different initial values to the permissible highest value Ta of 200° C. after initiation of the engine starting control. As is apparent from FIG. 7, the threshold value γ is set so as to decrease with an increase of the initial value of the clutch temperature Tc upon initiation of the engine starting control. Where the threshold value γ is set to be relatively low, the electric motor speed Nmg (input speed Nin) to be established upon completion of the shift-down action is relatively likely to exceed the threshold value γ, so that the shifting proceeding speed control portion 108 is relatively likely to lower the rate of change of the input speed Nin during the shift-down action. It is noted that the clutch temperature Tc is calculated, for example, on the basis of the temperature THoil of the working oil which influences the clutch temperature Tc, and according to a predetermined relationship between the clutch temperature Tc and the working oil temperature THoil, which relationship was obtained by experimentation. Alternatively, the clutch temperature Tc may be detected directly by a temperature sensor disposed adjacent to the engine connecting/disconnecting clutch K0.

Figure 8:
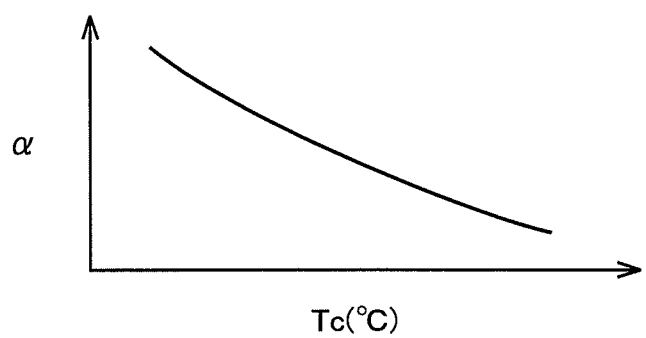
FIG. 8 graphically depicts a relationship between the clutch temperature upon initiation of the engine starting control and the rate of change of the input speed.

The shifting proceeding speed control portion 108 may be configured such that the rate of change α of the input speed Nin during the shift-down action is relatively low when the clutch temperature Tc upon initiation of the engine starting control is relatively high than when the clutch temperature Tc upon initiation of the engine starting control is relatively low. Namely, the input speed Nin is changed at a relatively low rate when the clutch temperature Tc upon initiation of the engine starting control is relatively high than when the clutch temperature Tc upon initiation of the engine starting control is relatively low. The shifting proceeding speed control portion 108 stores therein a map as graphically depicted in FIG. 8. The map of FIG. 8 represents a relationship between the clutch temperature Tc upon initiation of the engine starting control and the rate of change α of the input speed Nin, and determines the rate of change α on the basis of the clutch temperature Tc, and according to the above-indicated relationship. As is apparent from FIG. 8, the rate of change α decreases with an increase of the clutch temperature Tc upon initiation of the engine starting control. That is, the input speed Nin is changed at a relatively low rate when the clutch temperature Tc is relatively low. Accordingly, the speed value at which the engine speed Ne and the electric motor speed Nmg become equal to (i.e., synchronized with) each other decreases with an increase of the clutch temperature Tc, so that the amount of slipping of the engine connecting/disconnecting clutch K0 is reduced, and the amount of heat generated by the clutch K0 is reduced.

Figure 9:
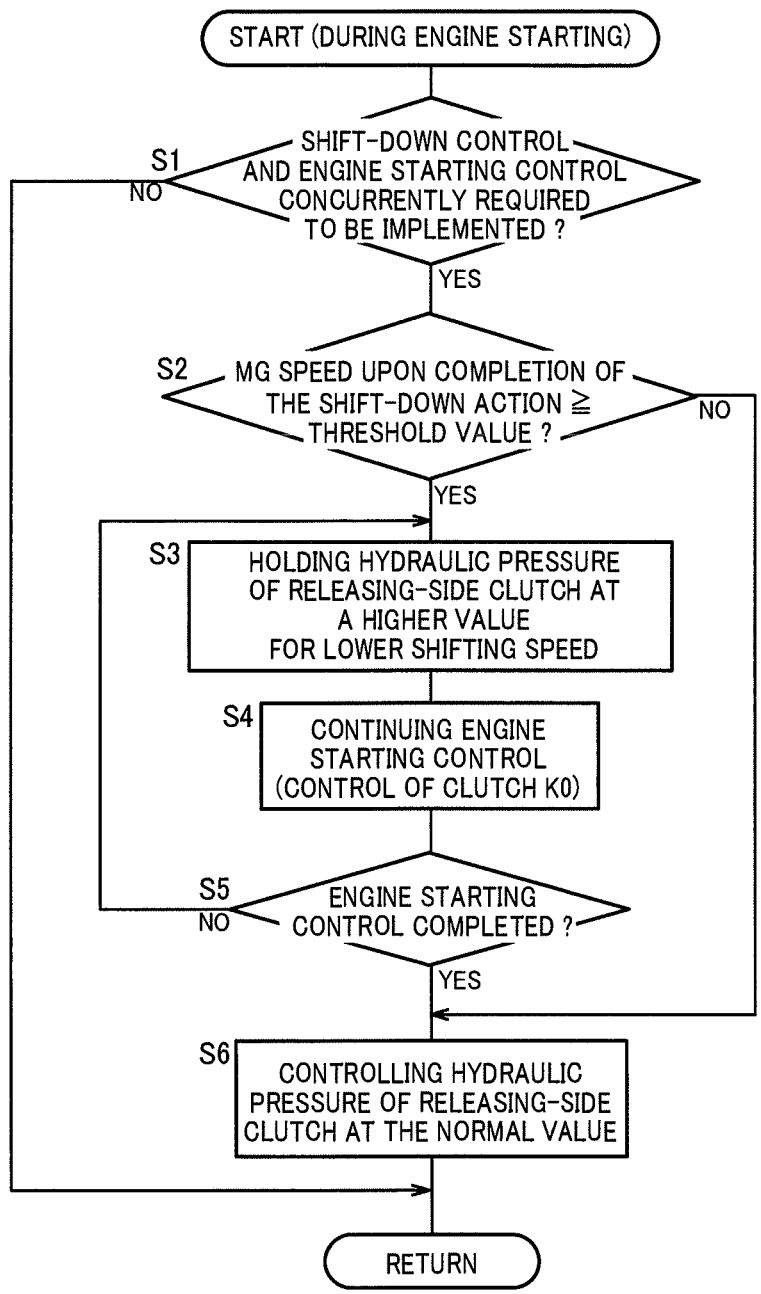
FIG. 9 is a flow chart of a major control operation of the electronic control device of FIG. 1 and, more specifically, a control operation to concurrently implement the engine starting control and the shift-down control of the automatic transmission.

FIG. 9 is a flow chart of major control operations of the electronic control device 100 according to embodiments described herein and, more specifically, a control operation to concurrently implement the engine starting control and the shift-down control of the automatic transmission 18. The control routine of the flow chart is, for example, repeatedly performed with a short cycle time of several milliseconds to several tens of milliseconds.

The control routine is initiated with step S1 (corresponding to the step-variable shifting control portion 102 and the engine starting control portion 106) to determine whether the shift-down control of the automatic transmission 18 and the engine starting control are required to be concurrently (simultaneously) implemented. It is noted that the term "concurrent" does not mean that the two controls are required to be initiated at the same time and terminated at the same time, but, instead, means that the time periods of the requirements for the two controls at least partially overlap each other. If a negative determination is obtained in step S1 ("step" being hereinafter omitted), one cycle of the present control routine is terminated. If an affirmative determination is obtained in S1, the control flow goes to S2 (corresponding to the shifting proceeding speed control portion 108 and the post-shifting speed calculating portion 112) to determine whether the electric motor speed Nmg (input speed Nin) to be established upon completion of the shift-down action of the automatic transmission 18 is equal to or higher than the threshold value γ. If a negative determination is obtained in S2, the control flow goes to S6 (corresponding to the shifting proceeding speed control portion 108) to control the hydraulic pressure Pout of the releasing-side clutch of the automatic transmission 18 such that the hydraulic pressure Pout of the releasing-side clutch of the automatic transmission 18 is held at the same value as in the normal shift-down action. If an affirmative determination is obtained in S2, the control flow goes to S3 (corresponding to the shifting proceeding speed control portion 108) to hold the hydraulic pressure Pout of the releasing-side clutch of the automatic transmission 18 to be released at a higher value than in the normal shift-down action, thereby lowering the shifting speed of the automatic transmission 18, so that the input speed Nin of the automatic transmission 18 is changed at a lower rate than in the normal shift-down action. While S3 is being implemented, S4 (corresponding to the engine starting control portion 106) is implemented. Then, the control flow goes to S5 (corresponding to the engine starting completion determining portion 110) to determine whether the engine starting control is completed during the shift-down action. If a negative determination is obtained in S5, the control flow goes back to S3 to maintain the hydraulic pressure Pout of the releasing-side clutch at the higher value. If an affirmative determination is obtained in S5, the control flow goes to S6 to control the hydraulic pressure Pout of the releasing-side clutch such that the hydraulic pressure Pout of the releasing-side clutch is held at the same value as in the normal shift-down action.

The present embodiment described above is configured such that the rate of change of the input speed Nin of the automatic transmission 18 to be increased by the shift-down action is relatively low when the input speed Nin of the automatic transmission 18 to be established upon completion of the shift-down action is relatively high than when the input speed Nin of the automatic transmission 18 to be established upon completion of the shift-down action is relatively low, so that the engine speed Ne has been increased to the electric motor speed Nmg when the engine speed Ne is relatively low. Accordingly, the amount of slipping of the engine connecting/disconnecting clutch K0 is reduced, and the deterioration of the engine connecting/disconnecting clutch K0 due to the generated heat can be prevented. Further, the rate of change of the input speed Nin is not so low when the input speed Nin of the automatic transmission 18 to be established upon completion of the shift-down action is relatively low, so that the completion of the shift-down action will not be delayed, whereby the vehicle response to the operator's desire for high vehicle drivability is improved. Thus, the change of the rate of change of the input speed Nin of the automatic transmission 18 depending upon the input speed Nin to be established upon completion of the shift-down action permits not only the prevention of the deterioration of the engine connecting/disconnecting clutch K0 due to the generated heat, but also an improvement of the vehicle response to the operator's desire for high vehicle drivability.

The present embodiment is further configured in view of the fact that the clutch temperature Tc to be established upon completion of the engine starting control is relatively high when the clutch temperature Tc upon initiation of the shift-down action is relatively high than when the clutch temperature Tc upon initiation of the shift-down action is relatively low, so that it is required to reduce the amount of heat generated due to a slipping action of the clutch when the clutch temperature Tc is relatively high. Namely, the present embodiment is configured such that the rate of change of the input speed Nin is relatively low when the clutch temperature Tc is relatively high than when the clutch temperature Tc is relatively low, so that the engine speed Ne has been increased to the electric motor speed Nmg when the engine speed Ne is relatively low, whereby the amount of slipping of the clutch is reduced. Accordingly, the amount of heat generated by the engine connecting/disconnecting clutch K0 is further reduced, and the deterioration of the engine connecting/disconnecting clutch K0 due to the generated heat is adequately prevented.

The present embodiment is also configured such that after the engine connecting/disconnecting clutch K0 has been brought into the fully engaged state during the shift-down action, the input speed Nin of the automatic transmission 18 is changed at the same rate as in the case where only the shift-down action is required to be performed. In the fully engaged state of the engine connecting/disconnecting clutch K0, heat is no longer generated by the engine connecting/disconnecting clutch K0, so that the input speed Nin is changed at the same rate as in the case of the normal shift-down action, whereby the vehicle response to the operator's desire for high vehicle drivability can be improved.

The present embodiment is further configured such that the rate of change of the input speed Nin of the automatic transmission 18 is lowered by holding the hydraulic pressure Pout of the releasing-side clutch of the automatic transmission 18 to be released for performing the shift-down action at the higher value than in the case where only the shift-down action is required to be performed. The shifting speed of the automatic transmission 18 is lowered by holding the hydraulic pressure Pout of the releasing-side clutch at the higher value. Thus, the rate of change of the input speed Nin can be easily lowered.

The present embodiment is also configured such that the rate of change of the input speed Nin of the automatic transmission 18 during the shift-down action is lowered when the input speed Nin of the automatic transmission 18 to be established upon completion of the shift-down action is equal to or higher than the predetermined threshold value γ. When the input speed Nin of the automatic transmission 18 to be established upon completion of the shift-down action is not higher than the predetermined threshold value γ, the input speed Nin of the automatic transmission 18 is changed at the normal rate, so that the shift-down action is not delayed, and the vehicle response to the operator's desire for high vehicle drivability is improved. It is noted that when the input speed Nin to be established upon completion of the shift-down action is not higher than the predetermined threshold value γ, the amount of slipping of the engine connecting/disconnecting clutch K0 and the amount of heat generated by the clutch are small without having to lower the rate of change of the input speed Nin, so that the deterioration of the engine connecting/disconnecting clutch K0 due to the generated heat is prevented.

Another embodiment of the control apparatuses and systems will now be described. In the following description, the same reference signs as used in the preceding embodiment will be used to identify the same or similar elements as in the proceeding embodiment, the description of which may be omitted to avoid redundancies.

Second Embodiment

While the preceding embodiment is configured to lower the shifting speed of the automatic transmission 18 when the shift-down control of the automatic transmission 18 is required concurrently with the engine starting control, the present embodiment is configured to implement a feedback control of the electric motor speed Nmg so as to prevent the electric motor speed Nmg from exceeding the predetermined threshold value γ, thereby reducing the amount of slipping of the engine connecting/disconnecting clutch K0 during the engine starting control to reduce the amount of heat generated by the engine connecting/disconnecting clutch K0 and, accordingly, prevent the deterioration of the engine connecting/disconnecting clutch K0 due to the generated heat, when the electric motor speed Nmg to be established upon completion of the shift-down action is equal to or higher than the threshold value γ.

In the present embodiment, the shifting proceeding speed control portion 108 provided in the preceding embodiment is replaced by an electric motor speed feedback control portion 120 (electric motor speed feedback control means). The electric motor speed feedback control portion 120 is configured to implement a feedback control of the hydraulic pressure Pout of the releasing-side clutch as an operating amount to be released for the shift-down action, so as to prevent the electric motor speed Nmg (input speed Nin) from exceeding the predetermined threshold value γ, when it is determined that the electric motor speed Nmg to be established upon completion of the shift-down action is equal to or higher than the threshold value γ. For example, the electric motor speed feedback control portion 120 implements the feedback control of the electric motor speed Nmg such that the electric motor speed Nmg changes to coincide with the threshold value γ.

Described more specifically, the electric motor speed feedback control portion 120 calculates, from time to time, a speed difference ΔNa between the electric motor speed Nmg and the threshold value γ, and calculates, from time to time, the hydraulic pressure Pout (commanded pressure value) of the releasing-side clutch on the basis of the calculated speed difference ΔNa and according to a known feedback control formula, so that the hydraulic pressure Pout is controlled to the calculated pressure value, thereby controlling the electric motor speed Nmg to coincide with the threshold value γ and preventing the electric motor speed Nmg from exceeding the threshold value γ. Thus, the electric motor speed Nmg is controlled such that the electric motor speed Nmg remains at the threshold value γ, and in the meantime the engine speed Ne is increased to the threshold value γ, so that the amount of slipping of the engine connecting/disconnecting clutch K0 is made smaller than in the normal shift-down action. Accordingly, the amount of heat generated by the engine connecting/disconnecting clutch K0 is reduced, so that the deterioration of the engine connecting/disconnecting clutch K0 by the generated heat is prevented.

Figure 10:
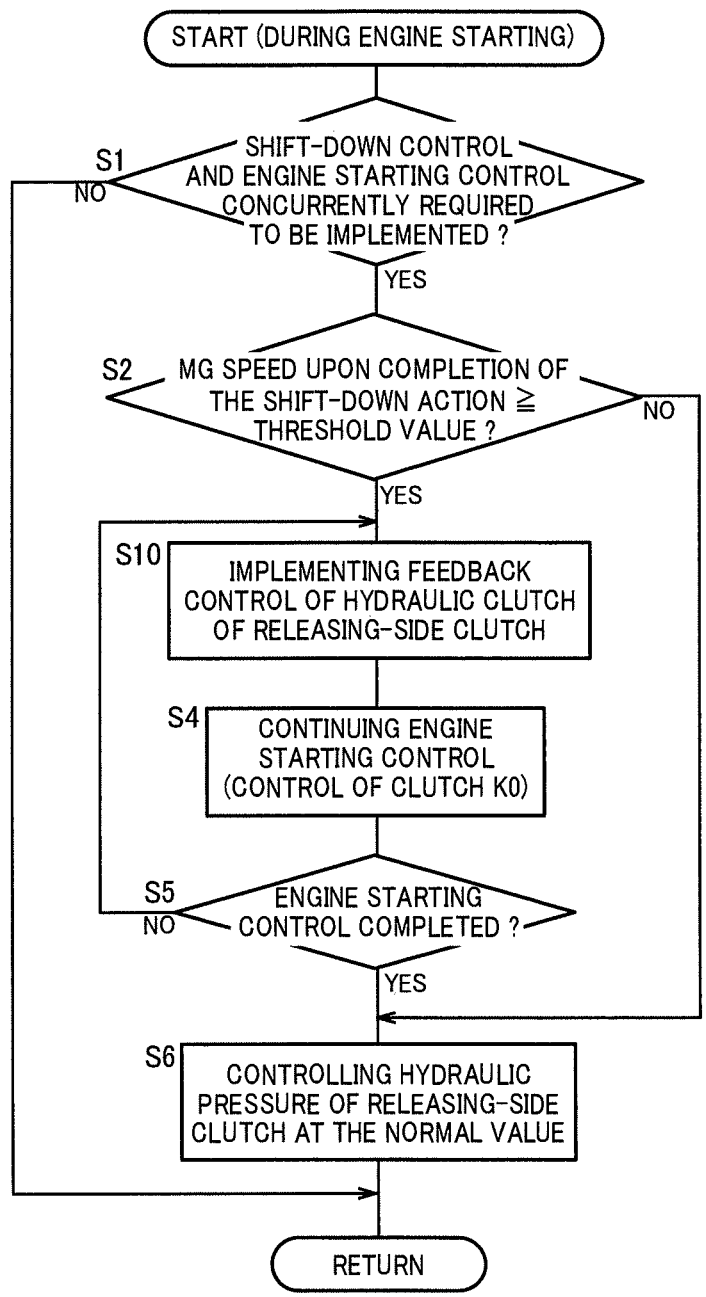
FIG. 10 is another flow chart of a major control operation of the electronic control device of FIG. 1 and, more specifically, a control operation to concurrently implement the engine starting control and the shift-down control of the automatic transmission.

FIG. 10 is another flow chart for explaining a major control operation of the electronic control device 100 according to the present embodiment, more specifically, a control operation to concurrently implement the engine starting control and the shift-down control of the automatic transmission 18.

The control routine is initiated with step S1 (corresponding to the step-variable shifting control portion 102 and the engine starting control portion 106) to determine whether the shift-down control of the automatic transmission 18 and the engine starting control are concurrently (simultaneously) required to be implemented. If a negative determination is obtained in step S1 ("step" being hereinafter omitted), one cycle of the present control routine is terminated. If an affirmative determination is obtained in S1, the control flow goes to S2 (corresponding to the electric motor speed feedback control portion 120 and the post-shifting speed calculating portion 112) to determine whether the input speed Nin of the automatic transmission 18 to be established upon completion of the shift-down action is equal to or higher than the threshold value γ. If a negative determination is obtained in S2, the control flow goes to S6 to control the hydraulic pressure Pout of the releasing-side clutch of the automatic transmission 18 such that the hydraulic pressure Pout of the releasing-side clutch of the automatic transmission 18 is held at the same value as in the normal shift-down action. If an affirmative determination is obtained in S2, the control flow goes to S10 (corresponding to the electric motor speed feedback control portion 120, to implement the feedback control of the hydraulic pressure Pout (commanded pressure value) of the releasing-side clutch) so as to prevent the electric motor speed Nmg from exceeding the threshold value γ, namely, so that the electric motor speed Nmg coincides with the threshold value γ. While S3 is being implemented, S4 (corresponding to the engine starting control portion 106) is implemented. Then, the control flow goes to S5 (corresponding to the engine starting completion determining portion 110) to determine whether the engine starting control is completed. If a negative determination is obtained in S5, the control flow goes back to S3 to continue the feedback control of the hydraulic pressure Pout of the releasing-side clutch. If an affirmative determination is obtained in S5, the control flow goes to S6 to control the hydraulic pressure Pout of the releasing-side clutch such that the hydraulic pressure Pout of the releasing-side clutch is held at the same value as in the normal shift-down action.

Figure 11:
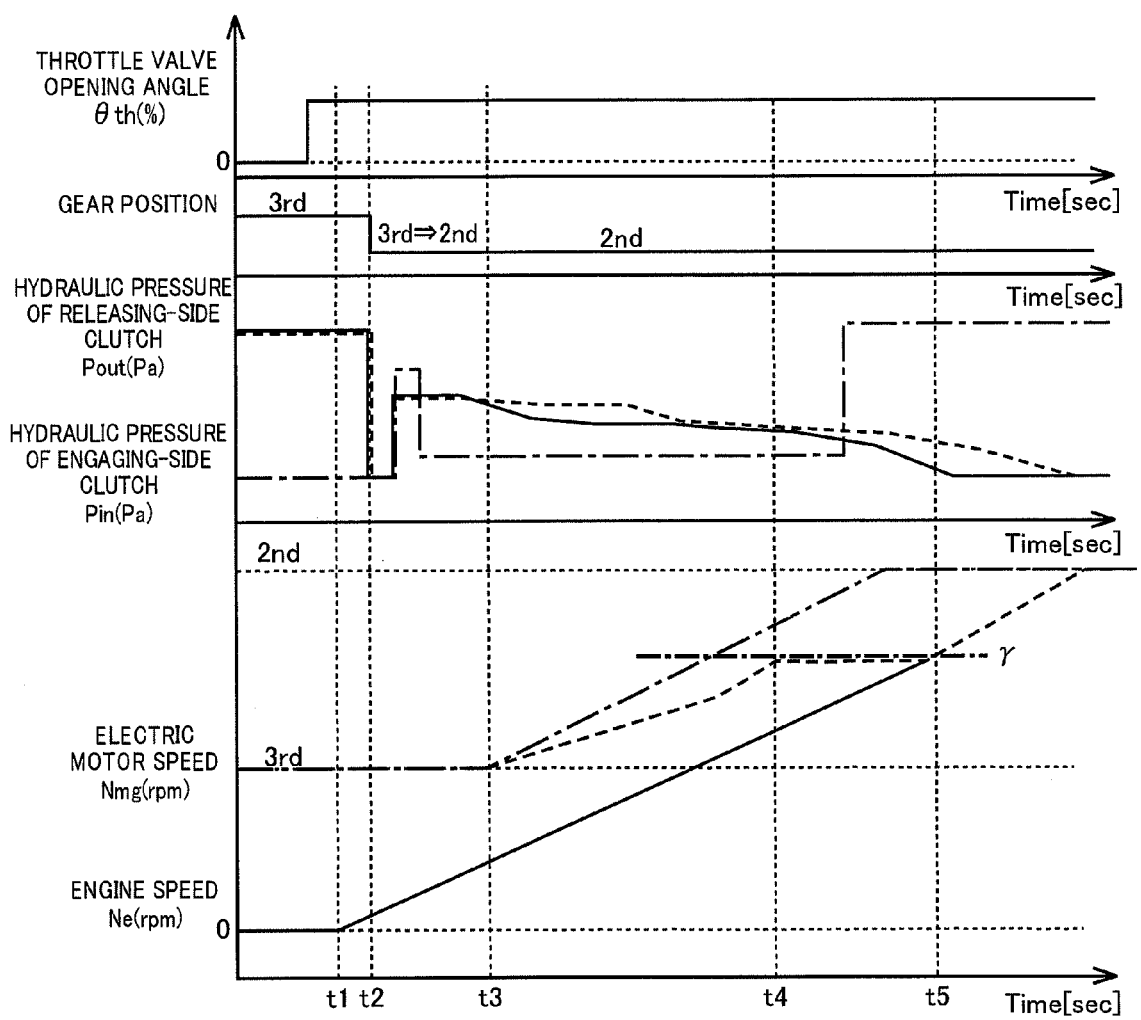
FIG. 11 graphically depicts a time chart showing a control operation performed by an electric motor speed feedback control portion of FIG. 2.

FIG. 11 graphically depicts a time chart showing a control operation performed by the electric motor speed feedback control portion 120. In the example of FIG. 11, the automatic transmission is shifted down from the third gear position to the second gear position.

In the example of FIG. 11, the requirement for switching the vehicle drive mode from the motor drive mode to the engine drive mode, that is, the requirement for the engine starting control, is determined when the throttle valve opening angle θth has been increased as a result of an operation of the accelerator pedal 76. Upon determination of this requirement, the engine starting control is initiated by the engine starting control portion 106 at a time t1, so that the engine speed Ne is increased in the slipping state of the engine connecting/disconnecting clutch K0. When the determination of the requirement for the shift-down action of the automatic transmission 18 from the third gear position to the second gear position is made at a time t2, the reduction of the hydraulic pressure Pout of the releasing-side clutch is initiated. In FIG. 11, a broken line indicates the hydraulic pressure Pout of the releasing-side clutch according to the present embodiment while a solid line indicates the hydraulic pressure Pout during the normal shift-down action. Further, a hydraulic pressure Pin (commanded pressure value) of the engaging-side clutch to be engaged, indicated by a long dashed short dashed line, is rapidly increased (for a temporary quick engaging action) and then held at a predetermined stand-by value. The automatic transmission enters into an inertia phase at a time t3, so that the input speed Nin and the speed Nmg of the electric motor MG connected to the transmission input shaft 36 through the lock-up clutch 38 are increased. In the present embodiment, the electric motor speed Nmg, which is indicated by the broken line, is feedback controlled so as to coincide with the threshold value γ. After the electric motor speed Nmg reaches the threshold value γ at a time t4, the electric motor speed Nmg is held at this threshold value γ. At a time t5 at which the engine speed Ne has been increased to the electric motor speed Nmg held at the threshold value γ, the engine connecting/disconnecting clutch K0 is placed in the fully engaged state, and the automatic transmission is shifted at the same speed as in the normal shift-down action.

In the present embodiment, too, the amount of slipping of the engine connecting/disconnecting clutch K0 during the engine starting control is reduced, with the electric motor speed Nmg being feedback controlled so as not to exceed the threshold value γ, so that the temperature Tc of the engine connecting/disconnecting clutch K0 will not exceed the permissible highest value Ta.

While various embodiments of the control apparatuses and systems for hybrid vehicles have been described in detail by reference to the drawings, it is to be understood that other embodiments of the control apparatuses and systems for hybrid vehicles are contemplated and may be otherwise embodied.

For example, the illustrated embodiments, which have been described as mutually independent embodiments, may be suitably combined.

While the control operations in the illustrated embodiments have been described on an assumption that the lock-up clutch 38 is placed in the engaged state, the control operations according to the embodiments described herein may be performed with the lock-up clutch 38 in the released state.

Various specific numerical values described with respect to the illustrated embodiments are given by way of example only, and may be suitably changed as needed depending upon the particular type of vehicle.

While the electric motor speed feedback control portion 120 in the illustrated embodiment implements the feedback control of the electric motor speed Nmg such that the electric motor speed Nmg does not exceed the upper limit γ, the target value to which the electric motor speed Nmg is controlled need not be the upper limit γ, but may be lower than the upper limit γ.

It is to be understood that the embodiments and their modifications have been described above for illustrative purpose only, and that the control apparatuses, systems and methods described herein may be embodied with various other changes and improvements without departing from the spirit and the scope of the subject matter described herein.

NOMENCLATURE OF REFERENCE SIGNS

10: Hybrid vehicle (Vehicle)
14: Engine
18: Automatic transmission (Transmission)
100: Electronic control device (Control apparatus)
MG: Electric motor
K0: Engine connecting/disconnecting clutch (Clutch)
Tc: Clutch temperature

The invention claimed is:

1. A control apparatus for a hybrid vehicle provided with an engine, an electric motor, a clutch for placing a power transmitting path between said engine and said electric motor in a power transmitting state and a power cutoff state, and a transmission disposed in a power transmitting path between said electric motor and drive wheels, the hybrid vehicle being switchable between a motor drive mode in which the hybrid vehicle is driven with said electric motor being used as a vehicle drive power source while said clutch is placed in a released state, and an engine drive mode in which the hybrid vehicle is driven with said engine being used as a main vehicle drive power source while said clutch is placed in an engaged state, and an operating speed of said engine being increased by said electric motor in a slipping state of said clutch when the hybrid vehicle is switched from said motor drive mode to said engine drive mode, said clutch being brought from said slipping state into a fully engaged state, wherein:

said control apparatus comprises a processor and a memory storing a computer readable and executable instruction set such that, when said transmission is selected to undergo a shift-down action while said hybrid vehicle is switched from said motor drive mode to said engine drive mode, said processor executes said computer readable and executable instruction set to:

calculate an input speed of said transmission to be established upon completion of said shift-down action;

compare said calculated input speed to a predetermined threshold value for adjusting a rate of change of a present input speed of said transmission; and decrease said rate of change of said present input speed of said transmission during said shift-down action when said calculated input speed is greater than or equal to said predetermined threshold value such that said rate of change of said present input speed of said transmission during said shift-down action is lower than when only the shift-down action is required to be performed.

2. The control apparatus according to claim 1, wherein said rate of change of said present input speed of said transmission decreases with an increase in a temperature of said clutch.

3. The control apparatus according to claim 1, wherein after said clutch has been brought into the fully engaged state during the shift-down action, said rate of change of said present input speed of said transmission is increased.

4. The control apparatus according to claim 1, wherein the rate of change of the input speed of said transmission is decreased by adjusting a hydraulic pressure of a releasing-side clutch of said transmission to be released for performing the shift-down action.

5. The control apparatus according to claim 4, wherein said hydraulic pressure of said releasing-side clutch of said transmission to be released for performing the shift-down action is held at a higher value than in a case where only the shift-down action is required to be performed.

6. The control apparatus according to claim 1, wherein the control apparatus calculates the input speed of said transmission to be established upon completion of said shift-down action based on a running speed of the hybrid vehicle and a gear ratio of said transmission.

7. The control apparatus according to claim 1, wherein said decrease of said rate of change is determined based on said calculated input speed of said transmission.

* * * * *